United States Patent [19]
Johansen et al.

[11] 3,994,049
[45] Nov. 30, 1976

[54] AUTOMATIC HARNESS RELEASE ASSEMBLY
[75] Inventors: David Lyman Johansen; Peter Julian Vaice, both of Yorba Linda, Calif.
[73] Assignee: Gulf & Western Industries, Inc., New York, N.Y.
[22] Filed: Oct. 14, 1975
[21] Appl. No.: 621,925

[52] U.S. Cl. .................. 24/230 AV; 244/151 A; 294/83 AE
[51] Int. Cl.² ...................................... A44B 11/25
[58] Field of Search ............. 85/DIG. 1; 24/201 D, 24/230 R, 230 A, 230 AP, 230 AV, 230 AT; 294/83 AE, 83 A; 244/151 A

[56] References Cited
UNITED STATES PATENTS
3,624,674   11/1971   Gaylord ........................ 24/230 AV
3,766,611   10/1973   Gaylord ........................... 24/230 A

*Primary Examiner*—Paul R. Gilliam
*Assistant Examiner*—Kenneth J. Dorner
*Attorney, Agent, or Firm*—Kenneth E. Merklen; Thomas E. Harrison, Jr.

[57] ABSTRACT

An automatic release assembly for a two-piece harness connector is provided with an electro-optic trigger responsive to a liquid environment. A rotatable locking shaft is forcibly rotated to unlock position by actuation of a force generating device integrated into the two-piece harness connector.

4 Claims, 10 Drawing Figures

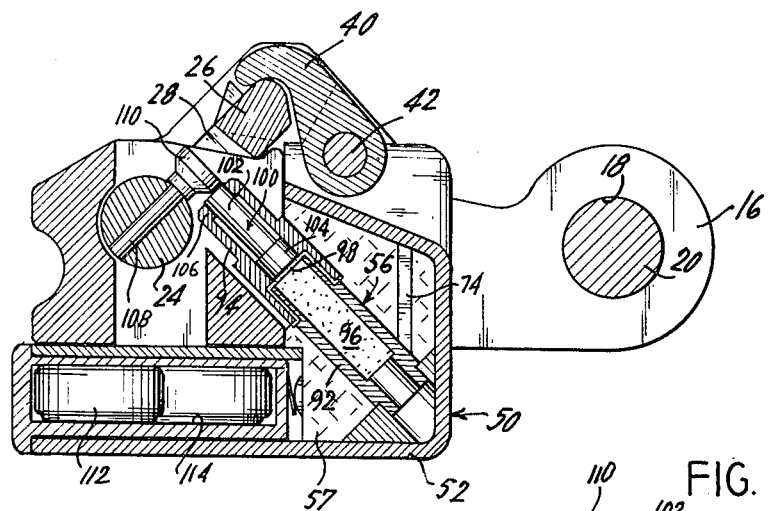
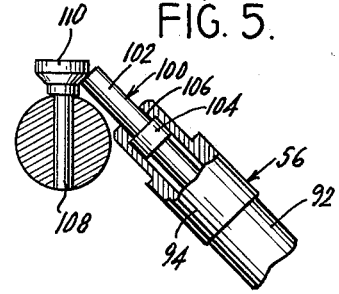
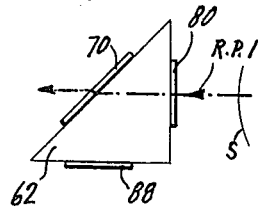
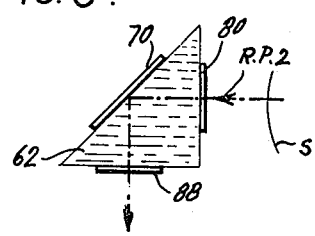
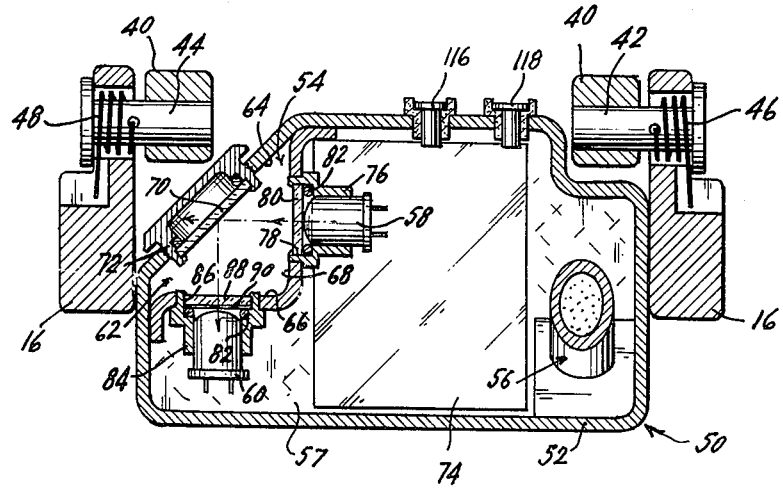

AUTOMATIC HARNESS RELEASE ASSEMBLY

PRIOR ART AND OBJECTIVES

The invention relates to two-piece connectors for straps of a harness, such as for a canopy, parachute or the like and particularly to a system for automatic release of such a harness.

There are many types of harness releases currently in use. One such harness release is disclosed in U.S. Pat. No. 3,183,568 issued May 18, 1965 to John A. Gaylord and assigned to the same assignee as the instant application.

This harness release includes male and female connectors, each having rearward ends adapted to engage opposite ends of a harness straps. The male strap connector has forwardly extending connector prongs adapted to be engaged in prong receiving channels in the female strap connector. A cross-shaft or locking shaft having cut-out portions or detents positioned for alignment with the prong receiving channels is rotatably mounted in the female strap connector intersecting the prong receiving channels. The two-piece harness is secured with the prongs of the male strap connector member positioned in the prong receiving channels and positively locked by the cross-shaft. To release the harness, the cross-shaft is rotated aligning the cut-out portions of the cross-shaft with the prong receiving channels, permitting the prongs of the male strap connector to be withdrawn from the female strap connector.

Systems have also been devised which provide for power release of such harness connectors in the event of an emergency. One such system is shown in U.S. Pat. No. 3,624,674 issued on Nov. 30, 1971 to John A. Gaylord and assigned to the same assignee as the instant invention. While these types of canopy releases have proved to be reliable, there exists the necessity for improvements in these harness releases, particularly automatic harness releases.

Accordingly, it is an object of this invention to provide an improved harness release.

It is a further object of the invention to provide a power actuated harness release. Another object of the invention is to provide a power actuated harness release which can be automatically opened in emergency conditions such as when the harness is in a fluid medium such as water.

In accordance with the illustrated embodiment of the present invention a two-piece separable connector, such as a male strap connector and a female strap connector, is provided in which projecting prongs of the male connecting member are inserted into receiving channels of the female connecting member and the prongs are locked in the receiving channels by a locking or cross-shaft secured in the frame of the female connecting member. An internal release pin is positively coupled to the cross-shaft or locking shaft in the female connector such that by displacing the release pin arcuately the cross-shaft or locking shaft is correspondingly rotated. The internal release pin may be forcibly moved or displaced arcuately so as to rotate the cross-shaft to an unlock position.

An electro-optic assembly, which responds to the presence of a fluid medium such as water serves to trigger a force means which acts upon the internal release pin and effects automatic release or separation of the two-piece connector. The electro-optic assembly includes a sensing assembly, which detects the presence of the fluid medium, and a firing assembly which is actuated by the sensing assembly. The sensing assembly may include a light source, such as a light emitting diode (LED), at one end of a light transmitting path, a light responsive means, such as a photosensitive device, or photodetector, at the opposite end of a controllable light transmitting path, a prism member, intermediate the light source and photosensitive device, which transmits light from the light source to the light responsive means only when immersed in the fluid medium, and an electronic circuit means responsive to a signal from the photosensitive device. The firing assembly includes a slidably mounted piston positioned to engage the internal release pin and an explosive charge which is detonated by an electrical signal from the electronic circuit means.

In operation when the prism of the sensing assembly is immersed in water, light is transmitted along a controlled path from the light source to the photosensitive device. The output of the photosensitive device serves to actuate a trigger circuit which detonates an explosive charge in the firing means which drives the piston into engagement with the internal release pin. The force exerted on the release pin drives the pin to effect rotation of the cross-shaft or locking shaft in the female connecting member, thereby permitting the separation of the male and female connecting members and release of the harness.

Other objects and features of the invention will become apparent to those skilled in the art when taken in connection with the following description and the accompanying drawings wherein:

FIG. 4 is a sectional view taken along lines 4—4 of FIG. 3 and showing the firing assembly of the electro-optic actuator;

FIG. 5 is a detailed view of FIG. 4 showing the piston member of the electro-optic actuator extended to rotate the pin member and cross-shaft through 45° to the release position;

FIG. 5a is a sectional view of the detonation system;

FIG. 6 is a sectional view taken along lines 6—6 of FIG. 4 showing the sensing assembly of the electro-optic actuator;

FIGS. 7 and 8 are diagrammatic views of the prism and light-transmitting path included to aid in the explanation of operation of the electro-optic actuator.

DESCRIPTION

Figure 1:
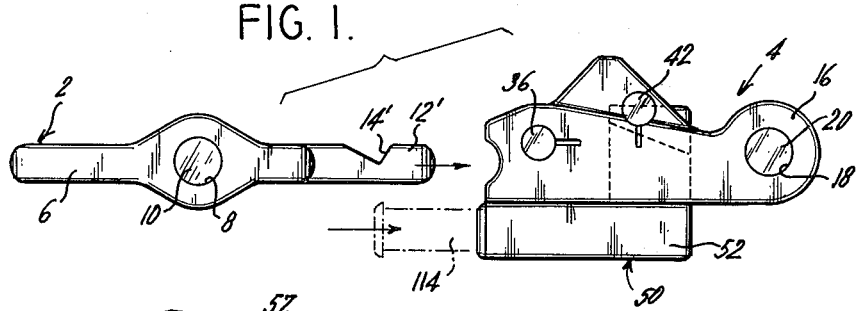
FIG. 1 is a side elevation view of the separated male and female strap connectors with the electro-optic actuator mounted in the female strap connecting member.
Figure 2:
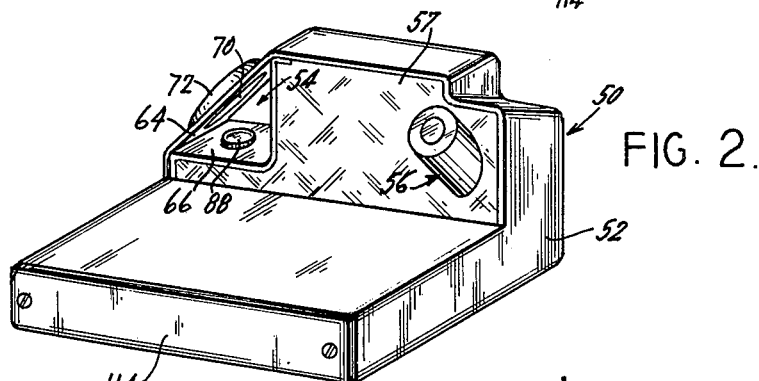
FIG. 2 is a perspective view of the electro-optic actuator.
Figure 3:
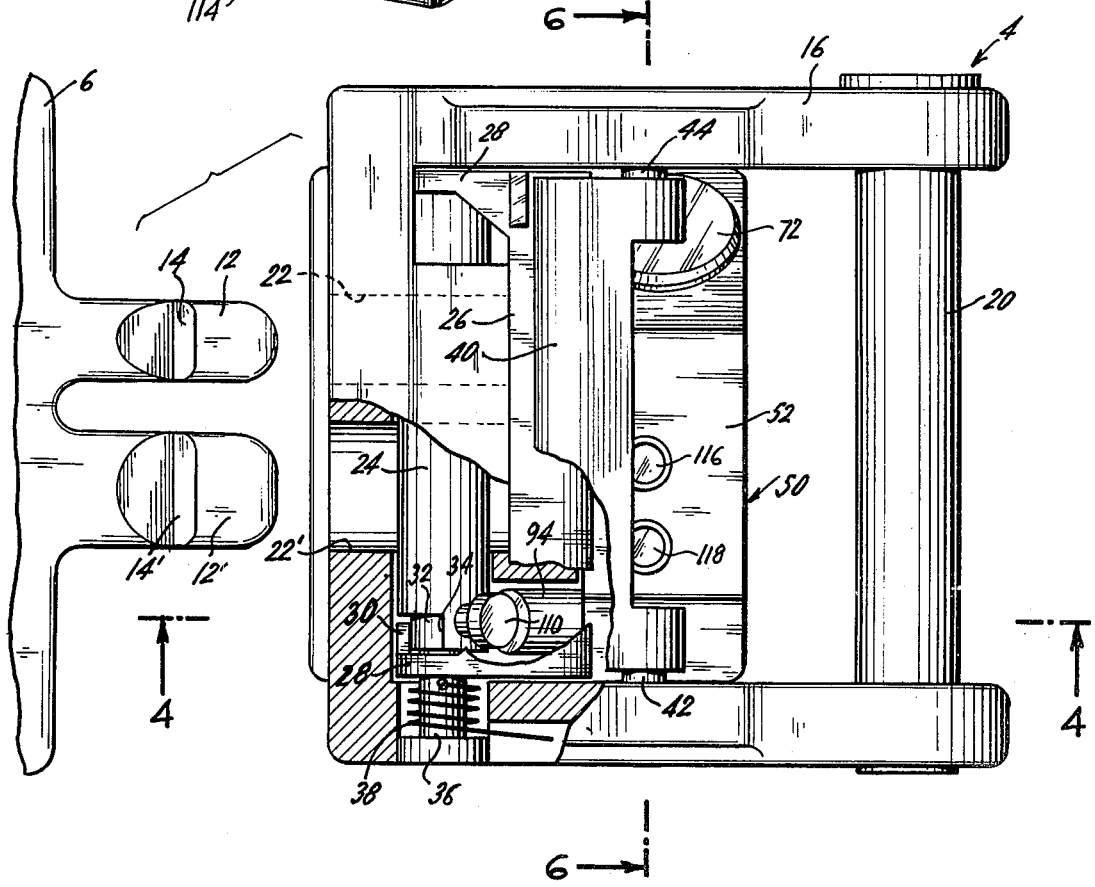
FIG. 3 is a detailed top elevation view of the female strap connector with parts broken away and sectioned and a partial view of the male strap connecting member released from the female strap connecting member.

Referring now to FIGS. 1–8, the harness release is a two piece component including a male strap connector 2 and a female strap connector 4. The male strap connector has a frame 6 provided with holes 8 on opposite sides thereof into which is secured a shaft 10 adapted to be engaged by a loop of a strap at one end of a harness, not shown. Extending forwardly of shaft 10 are connector prongs 12 and 12' having recesses 14 and 14' therein respectively. The female strap connector 4 has a frame 16 provided with holes 18 on either side thereof into which is secured shaft 20 adapted to be engaged by a loop of a strap, not shown, at the opposite end of the harness.

Frame 16 is formed with a pair of prong securing channels 22 and 22' which receive prongs 12 and 12' respectively of the male strap connector 2 to secure the harness. A cross-shaft 24 is journalled in frame 16 rearward of channels 22 and is positioned with a portion of the cross-shaft projecting into the channels 22 for securing the male connector by engagement with the prongs 12 in the recess 14. The cross-shaft 24 is formed with cut-away portions (not shown) aligned with the prongs securing channels 22. When the harness is secured, recesses 14 in prongs 12 of the male component 2 are engaged by shaft 24 of the female component 4 to prevent the prongs from being withdrawn from channels 22, thus securing the harness release. When shaft 24 is rotated in a counterclockwise direction, so that the cut-away portions of shaft 24 face channels 22, the shaft 24 becomes disengaged from the recesses 14 so that the prongs 12 of the male component may be withdrawn from the channels 22 and thus uncouple the male component from the female component effecting release of the harness.

The cross-shaft 24 may be manually rotated by yoke or release lever 26. The extremes of yoke lever 26 are provided with lever arms 28 having inwardly projecting teeth 30 which fit into slots 32 of the cross-shaft separated by ribs 34 in the opposite ends of cross-shaft 24. The yoke or release lever 26 and the cross-shaft 24 have a common axis, each movable rotationally about the common axis. When the yoke is displaced counter-clockwise teeth 30 abut ribs 34 and rotate cross-shaft 24 also in a counter-clockwise direction effecting disengagement of the cross-shaft from the recess or detent 14, to permit release of prongs 12 from channels 22. The cross-shaft 24 and yoke lever 26 are journalled on pins 36 at opposite sides of frame 16. A coil spring 38 anchored to pin 36 and frame 16 urges the cross-shaft to turn in a clockwise direction. A locking flap 40 which locks yoke or release lever 26 in place is mounted in frame 16 by pins 42, 44 which project through holes in opposite sides of the frame. Coil springs 46, 48, anchored to pins 42, 44 and frame 16 tend to rotate locking flap 40 in a counter-clockwise direction locking the yoke lever 26 in lock position. The overlapping of locking flap 40 over the yoke lever 26 is shown more clearly in FIG. 4.

To secure the male component to the female component, prongs 12 are inserted into channels 22. The leading portions of the prongs push against the biased or spring-loaded cross-shaft which rotates the cross-shaft against the biased direction until the cut-out portions thereof are rotationally displaced so as to permit the prongs to be fully inserted into the channels. The arrangement of teeth 30, ribs 34 and spring 38 permits rotation of cross-shaft 24 without movement of yoke lever 26. After the forward edge of recess 14 passes cross-shaft 24, spring 38 snaps cross-shaft 24 into the locking position.

To manually release the male component from the female component after engagement, locking flap 40 is rotationally displaced exposing the locking lever 26. The lever 26 is then rotated counterclockwise. In its counterclockwise travel the teeth 30 of release lever 26 engage ribs 34 on cross-shaft 24 effecting counter-clockwise rotation of the cross-shaft, rotationally displacing cross-shaft 24 and the detents on the shaft thus permitting withdrawal of the prongs 12 from the channels 22. The coil springs associated with the release lever and locking flap return these members to their original positions after the forces applied to them are released.

More detail of the arrangement and operation of the harness release as thus far described can be obtained from U.S. Pat. No. 3,183,568, issued May 18, 1965 to John A. Gaylord and assigned to the same assignee as this application which is expressly incorporated by reference herein.

For automatic power activated release, the harness release is provided with an electro-optic actuator assembly 50 mounted in female strap connector 4. Actuator assembly 50 includes a housing 52 supporting a sensing assembly, generally designated by reference numeral 54 (FIG. 6), both of which are encapsulated in a potting compound 57 to provide environmental and structural support for the components.

Sensing assembly 54 includes an energy radiation or light source 58, such as a light-emitting diode (LED), for example, positioned at one end of a radiation transmission path and a radiation responsive element 60, such as a photodetector, for example, positioned at the opposite end of the controlled radiation transmission path. Intermediate the transmission path between the light source 58 and photodetector 60 is a hollow triangular prism 62, bounded by side walls 64, 66 and 68. A refractor/reflector plate 70 is mounted on wall 64 in a threaded housing 72. The threaded-screw coupling provides for movement of plate 70 with respect to wall 64 for optimum reflection of radiation to photodetector 60, when the plate 70 is functioning in the reflection mode. Thus, a finely defined wave path may be generated to guard against transient waves activating the radiation detector.

The plate 70 serves both as a reflector, when the hollow prism 62 is filled with water, and as a transparent element, when the hollow prism 62 is in an air environment, with respect to the radiated light waves generated by the light emitting diode. When functioning in the reflection mode, adjustability of the plate 70 is desirable in order to reflect as much of the energy generated by the LED to the photodetector as possible.

When functioning in the refraction mode, the plate 70 is essentially transparent to the radiated waves and, since the plate 70 is at an inclined angle with respect to the path of the radiated waves the waves strike the plate 70, refract slightly when passing through the plate and continue on a course slightly offset from the plane of the original path.

In the preferred embodiment the radiation source 58 is a light source, a light emitting diode (LED), for example, which radiates light in the infrared portion of the spectrum. The radiation responsive means 60 is a photodetector, for example, particularly responsive to infrared radiation and tuned to a particular wave length. Light from the LED 58 is filtered as by the filters 80 and/or 90 so that only a predetermined wave length of light radiated from the LED and reflected by the plate 70 along a finely defined path impinges upon the most sensitive part of the photodetector 60. Although two filters, 80 and 90 are shown in many cases it will be found that only one filter may be needed.

Figure 9:
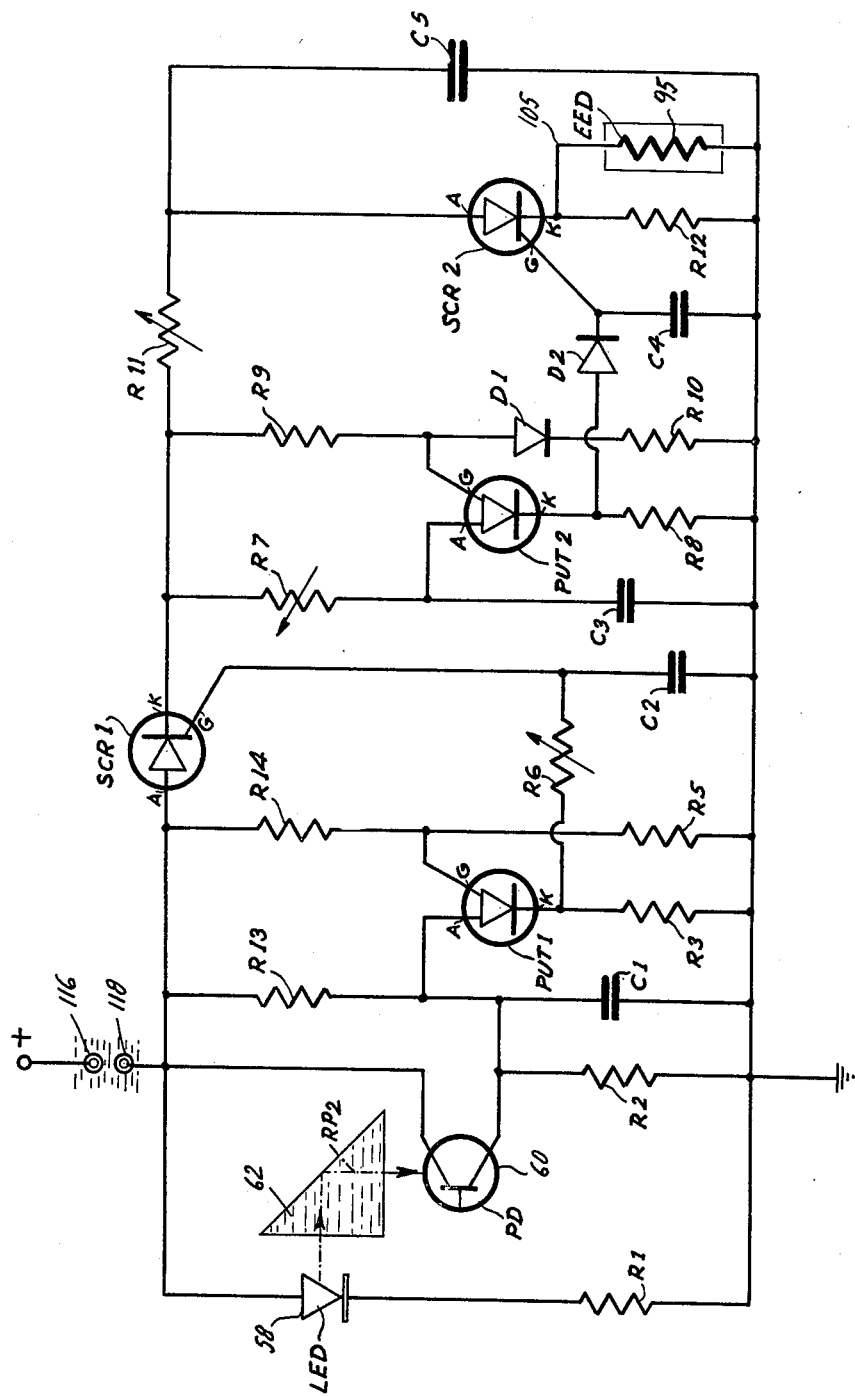
FIG. 9 is an electrical schematic diagram of the circuit responsive to light for detonating the explosive in the firing assembly of the electro-optic actuator.

Light source 58 is mounted in frame 76 behind an aperture 78 in wall 68. Mounted in aperture 78 is a plate or filter 80 formed of a material which is transparent to light emitted from light source 58. An O-ring 82 seals the aperture. Similarly, photodetector 60 is mounted in frame 84 behind aperture 86 in wall 66. Mounted in aperture 86 is a plate 88 formed of a material which is transparent to light emitted from light source 58. Positioned behind plate 88 is a filter 90 which, in the preferred form, filters all light waves except for a predetermined wave length which is passed to the photodetector. Aperture 86 is sealed by O-ring 82. The sensing assembly also includes an electronic circuit which is activated by signals from the photodetector 60 which is part of the circuit. The electronic components are mounted on circuit board 74 secured in housing 52. FIG. 9 is a schematic diagram of the electronic circuit which will be described in greater detail below.

As shown in FIG. 7, when the hollow prism 62 is in an air environment the radiation path from the source S follows the path R.P.$_1$, passing into the hollow body of the prism and through the plate 70. In an air enviroment the plate 70 is essentially transparent to the radiation generated by the source S. The plate 70 being at an inclined angle, the waves when striking the plate 70 would be refracted slightly while passing through the plate. The waves then continue slightly offset from the plane of the original path.

When the hollow body of the prism is filled with water the radiation path, as seen in FIG. 8, follows the path R.P.$_2$. Radiation generated at source S passes through the plate 80 into the water environment, the radiant waves being refracted so that by refraction and reflection, via the prism 62 and plate 70, respectively the waves are directed to and through the plate 88.

In operation, when the electro-optic actuator is in an air environment, (see FIG. 7) light from light source 58 is transmitted through plate 70 and does not reach photodetector 60. When the actuator is immersed in water, (see FIG. 8) the water fills prism form 62 and light is refracted by the prism and reflected from plate 70 to photodetector 60. The photodetector 60, being responsive to radiation of the wave length generated by the radiation generating source 58 produces a signal in response thereto which is processed in the electronic circuit and utilized in a manner to be described below effecting release of the two-piece harness assembly. Essentially the electro-optic actuator serves as a switch which is open when in an air environment and closed when the prism form 62 is filled with water.

The firing assembly consists of an electrically explosive device (EED), normally referred to as a "Squib," installed in a captive mount which forms a coaxial connector to the squib to transfer an electric pulse to an internal bridge wire of the EED. The EED includes a case or housing, a piston, a plunger, an explosive charge, a coaxial center connector and a bridge wire connected to the case and the coaxial center connector. The high energy electric pulse generated in the electronic circuit is applied to the internal bridge wire via the coaxial center connector, the bridge wire being connected between the coaxial center connector (which is insulated from the case) and the case, which serves as a connection to the ground side of the circuit. The electric pulse, when applied to the bridge wire, causes the bridge wire to heat resulting in detonation of the explosive charge. When the explosive charge is detonated the piston moves in an axial direction causing the plunger to travel until the piston engages the shoulder of the housing.

The firing assembly 56 may be a squib assembly which is an integrated piston, plunger and explosive device which is inserted into the firing chamber or may be separate parts. The firing assembly is represented as including two concentric housings 92, 94 held in housing 52 by threaded plug 53. The housing 92 contains an explosive charge, 96 which is detonated by an electrical signal from the electronic circuit shown in FIG. 9. A membrane 98 is a dielectric separator between the two housings 92 and 94. Slidably mounted in housing 94 is a piston 100 having a plunger 102 and a lower outwardly extending flange 104 which is engaged by shoulder 106 when the piston is in its extended position (FIG. 5). A pin 108 is secured to cross-shaft 24 and extends upward through an opening in the frame 16 adjacent lever arm 28. The pin has a head 110 which is positioned to be engaged by the upper surface of piston 100.

Detonation of the explosive charge 96 produces an expansion of gases which forces piston 100 upward contacting the tapered neck of head 110. Extension of the piston 100 drives the head 110 and pin 108 arcuately thereby producing a corresponding rotation of cross-shaft 24 (FIG. 5) without movement of yoke lever 26. Rotation of cross-shaft 24 by the travel of piston 100 and consequent displacement of head 110 and shaft 108 aligns the cut-out portions of the cross-shaft 24 with channels 22 releasing the prongs 12 of the harness.

The firing assembly is inserted into the housing 52 by insertion into the firing chamber. A threaded plug 53 is provided to close the firing chamber and secure the firing assembly. After the EED has been fired the plug 53 may be removed and the spent charge, or the entire squib, may be removed and a new charge, or a new squib, may be inserted into the firing chamber. In the preferred arrangement the firing assembly, including the case, the piston, the plunger, the explosive charge and the detonation means is provided as an integrated unit (here referred to as a squib) which is inserted into the firing chamber and secured by the threaded plug 53. It may, however, be preferred to separate the firing assembly into its individual parts so that the piston and plunger will be reusable and the explosive charge need only be replaced after firing. Replacement of the spent charge or the spent squib makes the automatic release assembly reusable without replacement.

Electrical power for the electric-optic assembly is provided by batteries 112 held in battery compartment 114 which is slidably secured in the electro-optic assembly by screws or other suitable means. As a further safety feature and to prevent unintended opening of the harness, electrical power for the electronic circuit board 74, light source 58 and photodetector 60 is established through arming sensor 116 coupled to a source of voltage and arming sensor 118 coupled to the electronic circuit, light source and photodetector. Immersion of the assembly in water establishes a conducting path between the sensors completing the electrical circuit.

Although the preferred embodiment is illustrated as being battery operated it will be understood that a chargeable power-pack may be used to provide electric power. A power pack may require terminals which may connect into an exterior electrical system. The power pack could be pre-charged or if the harness release were to be used in an aircraft, the power pack could be coupled to the electrical system of the aircraft. A quick-release electric coupling could be used so that separation from the master electric system will be rapid.

Referring now to FIG. 9, there is shown a schematic diagram of an electronic trigger circuit specifically arranged to respond to the incidence of light on the photosensitive device and produce an electrical control signal to detonate explosive charge 96. In FIG. 9, the light source 58 is represented as a light-emitting diode also referred to by the reference LED; the photodetector 60 is represented by a phototransistor designated PD; and the electrically explosive device is designated EED.

As shown in FIG. 9, LED 58 and resistor $R_1$ are connected in series between arming sensor 118 and ground. Positive potential is applied to the circuit through arming sensor 116 and fluid coupling between sensors 116 and 118. A phototransistor, PD, having an electrical property which varies in response to the incidence of the radiation thereon, as is well known in the art, is provided. One terminal of the phototransistor PD is coupled to the positive terminal of the voltage supply and the other terminal is coupled through resistor $R_2$ to ground; resistor $R_2$ and phototransistor PD forming a voltage divider network. The junction of phototransistor PD and resistor $R_2$ is coupled to the anode A of programmable unijunction transistor, $PUT_1$ and the junction of resistor $R_{13}$ and capacitor $C_1$. The gate, G of transistor $PUT_1$ is coupled to the junction of voltage divider $R_5$ and $R_{14}$ and the cathode K of transistor $PUT_1$ is coupled to ground through a resistor $R_3$. The cathode of transistor $PUT_1$ is also coupled to a timing network consisting of variable resistor $R_6$ and capacitor $C_2$ which controls the operation of a switching gate such as silicon controlled rectifier $SCR_1$. Specifically, the gate G of $SCR_1$ is coupled to the junction of $R_6$ and $C_2$. Resistor $R_7$ and capacitor $C_3$ form a second timing network which is coupled between the output of the silicon controlled rectifier $SCR_1$ and ground. The anode A of a second programmable unijunction transistor, $PUT_2$ is coupled to the junction of resistor $R_7$ and capacitor $C_3$. The gate G of the second unijunctional transistor $PUT_2$ is coupled to the junction of resistor $R_9$ and the anode of diode $D_1$. The other terminal of resistor $R_9$ is coupled to the cathode K of silicon controlled rectifier $SCR_1$. The cathode K of the silicon controlled rectifier $SCR_1$ is also coupled to a third timing network consisting of variable resistor $R_{11}$ and capacitor $C_5$. Resistor $R_{10}$ is coupled between the cathode of diode $D_1$ and ground. The cathode K of transistor $PUT_2$ is coupled through resistor $R_8$ to ground and to the anode of diode $D_2$. The cathode of diode $D_2$ is coupled to the gate circuit of a second selectively energizable switch such as $SCR_2$. The anode A of $SCR_2$ is coupled to the junction of resistor $R_{11}$ and capacitor $C_5$. The cathode K of $SCR_2$ is coupled to the electrically explosive device EED which is detonated upon the application of electrical power. Resistor $R_{12}$ is coupled across the EED and capacitor $C_4$ is coupled between the gate of $SCR_2$ and ground.

In operation, when the trigger circuit is immersed in water, electrical power is applied to the circuit through sensors 116, 118 and light is transmitted from the LED, through the water filled prism 62 to the phototransistor PD. Light produces a change in the electrical resistance of phototransistor PD which produces an increased current flow therethrough, raising the voltage at the anode A of transistor $PUT_1$. When the voltage at the anode of transistor $PUT_1$ reaches a predetermined threshold level, the transistor switches to an ON state and current flows through the transistor raising the voltage across resistor $R_3$. This voltage increase is transferred through timing network $R_6$ and $C_2$ to the gate G of silicon controlled rectifier $SCR_1$. After a first predetermined time interval established by the timing network $R_6$, $C_2$, the silicon controlled rectifier $SCR_1$ is switched to its conducting state thereby energizing stage two of the cascaded, time controlled trigger circuit. Current flows through two networks, the first, consisting of surge resistor $R_{11}$ and $C_5$ and the second consisting of $R_7$ and $C_3$. During the time interval established by the $R_7$, $C_3$ network the capacitor $C_5$ is charged through $R_{11}$. Essentially the second network $R_{11}$, $C_5$ of the second stage serves to charge the capacitor $C_5$ for firing the electrically explosive device EED. After a predetermined time interval established by $R_7$ and $C_3$ the threshold voltage for the transistor $PUT_2$ is reached and current flows through that transistor to the gate G of $SCR_2$. When $SCR_2$ switches to a conducting state, the charge built up and stored in capacitor $C_5$ flows through $SCR_2$ to the EED causing the detonation wire 95 of the EED to heat up and detonate the device. The EED piston ruptures membrane 98 and forces piston 100 upward effecting release of the harness. The resistors $R_6$, $R_7$ and $R_{11}$ are shown as adjustable to indicate that the timing may be adjusted.

FIG. 5a illustrates one form of detonation system using a detonation wire. The base 93 of case 92 is electrically insulated from the case and detonation wire 95 is connected between the base 93 and the case 92, the case 92 being connected to the electrical ground. Lead 105, also shown in FIG. 9, connects to the electronic trigger circuit on the printed circuit board 74. The plug 53 has an insulation pad which holds the lead 105 connected to the base 93.

The prism member of the present embodiment is shown as a hollow bodied prism which, when filled with air, is substantially void of prismatic functions with respect to the radiation generated by the radiation source. Thus, creating a first path for the generated radiant waves. When the hollow body of the prism is filled with water the prismatic functions, as respects the radiation generated by the radiation source, are expressed by reflection of the waves so that a second path for the generated radiant waves is created.

In the alternative, a solid body prism could be used in which the prismatic functions of the solid body prism, as respects the radiation, are expressed by reflection of the waves when the solid body prism is in an air environment. When the solid body prism is in a liquid environment, such as water, the prismatic functions would substantially cease, thus generating two paths for the radiated waves, depending upon what environment the prism is located. In the case of a solid body prism either the radiation source or the radiation detection and response means would be repositioned, as compared to the illustrated positions.

Although the preferred embodiment provides for a wire arrangement for detonating the explosive charge of the firing assembly an alternate arrangement may include a detonation cap which may be electrically detonated. The detonation cap could be held in place by the threaded plug, holding the cap securely against or in the base of the explosive charge. An insulated lead in the thread plug may be connected to the circuit carrying the electric pulse, such lead making contact with an insulated terminal in the cap, the case of the cap being connected to ground.

The EED may include a case which includes a cylindrical body, such as section 92 of the illustrated firing assembly. The base of the case may be insulated from the cylindrical body and the detonation wire may be connected between the insulated base and the cylindrical body, passing through, or in intimate contact with the explosive charge. Electric contact with the base of the case is made so that the electric charge from the electronic trigger circuit may be applied to the detonation wire through the insulated base of the case of the EED. The cylindrical body of the case serves as a connection to electrical ground of the electronic trigger circuit.

A preferred embodiment of the invention has been illustrated and described and several alternate arrangements have been described along with several different uses to which the invention can be placed. Other alternate construction including changes, modification and substitution of parts may be made, as will be obvious to those skilled in the art without departing from the spirit of the invention.

What is claimed is:

1. A harness connector including at least a male member having a rearward end adapted to engage one end of a harness strap and a forward end having connector prongs extending forwardly thereof, a female member having a rearward end adapted to engage the opposite end of said harness strap and a forward end having prong receiving channels for receiving said connector prongs, a release assembly including a cross-shaft mounted in said female member to intersect said receiving channels, said cross-shaft having cut out portions in said receiving channels and having at least a first position for securing said male connector prongs and a second position for releasing said male connector prongs, the combination of;

a pin member mounted on said cross-shaft of said female member for forcibly rotating said cross-shaft from said first position to said second position when driven by a force, an explosive device, including a detonation means, mounted in said female member for providing an explosive force upon being detonated by said detonation means, piston means slidably mounted in said female member and adapted to receive said explosive force upon detonation of said explosive device and for exerting a driving force on said pin member in response to said explosive force, for driving said pin member for forcibly rotating said cross-shaft to said second position, an electro-optic actuator assembly mounted on said female member for detonating said detonation means, said actuator assembly including a source of power, a light source driven by said source of power and positioned at one end of a light transmission path, means responsive to light from said light source at the opposite end of said transmission path, prism means position in said light transmission path and responsive to the presence of a liquid for directing said light from said light source along said light transmissions path to said means responsive to light when said prism means is in a liquid environment and for off-setting said light from said light transmission path, away from said means responsive to light, when out of said liquid environment, and means coupled to said light responsive means and to said power supply and to said detonation means for detonating said detonation means in response to the incedence of light on said light responsive means.

2. A harness connector as in claim 1 and in which said prism means includes a prism chamber adapted to be filled with liquid for directing said light along said transmission path to said means responsive to light only when said prism chamber is filled with liquid.

3. A harness connector as in claim 1 and further including arming sensor means coupled between said power supply and said actuator assembly for maintaining said actuator assembly in an inactive state until said arming sensor means becomes introduced into said liquid environment.

4. A harness connector as in claim 1 and further including
a reloadable chamber for receiving said explosive device and removable plug means for removably securing said explosive device in said reloadable chamber and for permitting access to said reloadable chamber, when said removable plug is removed, for removal of discharged said explosive device and for according reloading of said reloadable chamber.

* * * * *